Figure 1:
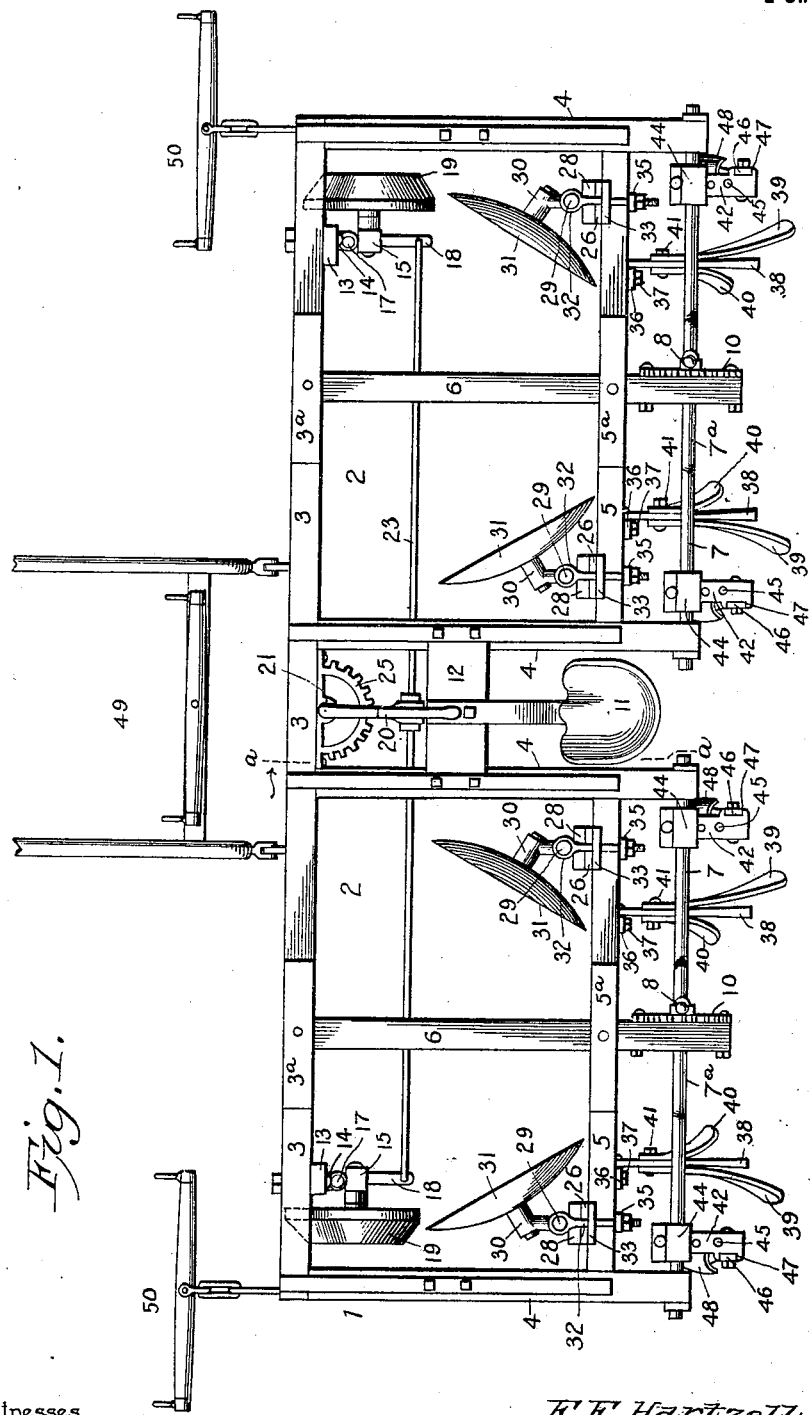

No. 669,165. Patented Mar. 5, 1901.
E. E. HARTZELL.
CULTIVATOR.
Application filed Nov. 6, 1900.

(No Model.) 2 Sheets—Sheet 1.

Witnesses
Howard D. Orr
J. W. Garner

E. E. Hartzell, Inventor,
by C. A. Snow & Co.
Attorneys

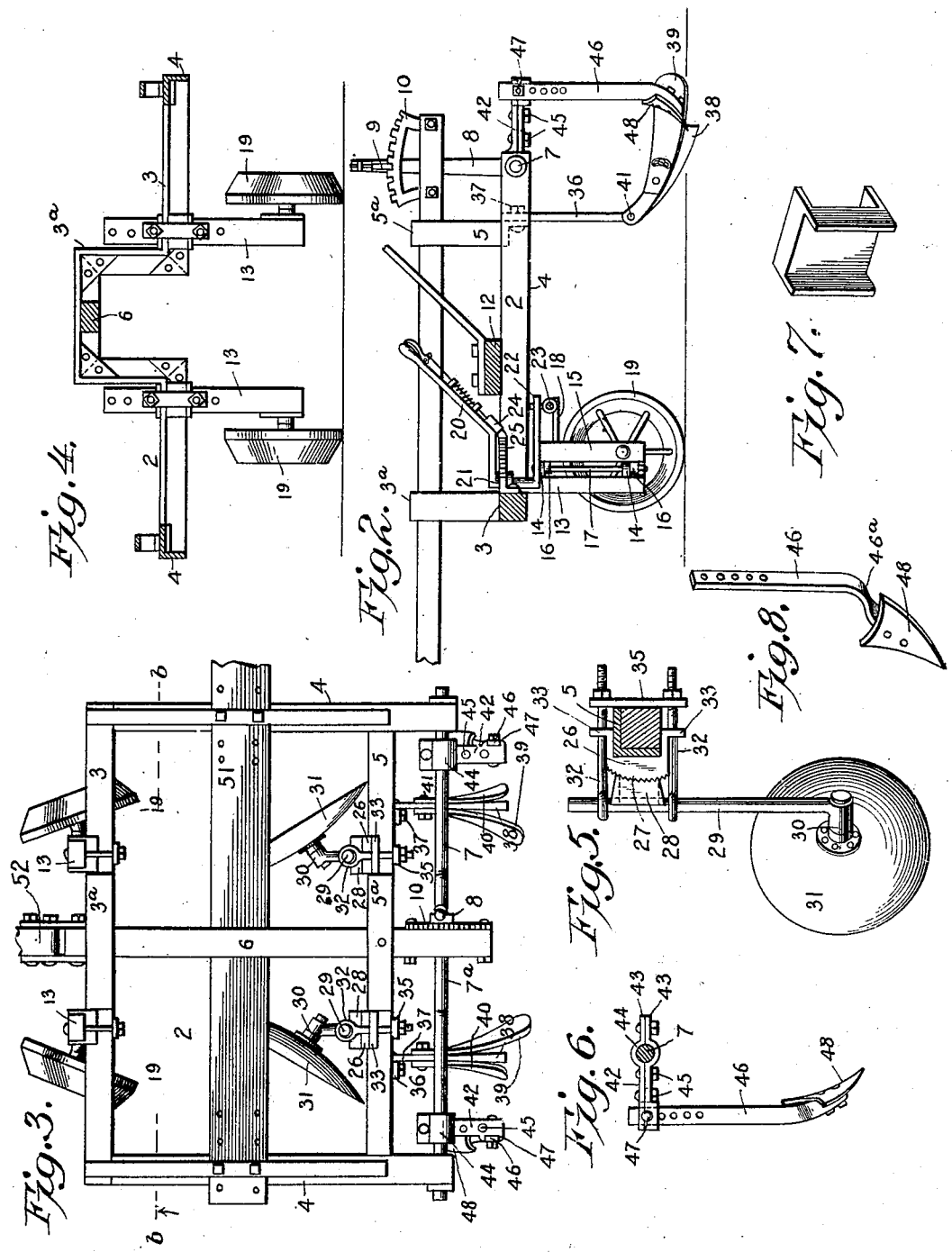

UNITED STATES PATENT OFFICE.

ELI E. HARTZELL, OF MARYVILLE, MISSOURI.

CULTIVATOR.

SPECIFICATION forming part of Letters Patent No. 669,165, dated March 5, 1901.

Application filed November 6, 1900. Serial No. 35,645. (No model.)

*To all whom it may concern:*

Be it known that I, ELI E. HARTZELL, a citizen of the United States, residing at Maryville, in the county of Nodaway and State of Missouri, have invented a new and useful Cultivator, of which the following is a specification.

My invention is an improved cultivator; and it consists in the peculiar construction and combination of devices hereinafter fully set forth, and pointed out in the claims.

One object of my invention is to combine with the cultivator-disks with which the frame is provided guide-wheels in advance thereof, which by engagement with the soil prevent the cultivator from moving laterally and direct the cultivating-disks parallel with the rows of growing corn.

A further object of my invention is to provide means whereby the guide-wheels and cultivating-disks may be adjusted laterally on the frame of the cultivator to enable the cultivator to be used for cultivating as closely to the plants or as far therefrom as may be desired.

A further object of my invention is to combine with the cultivating-disks vertically-adjustable runners which operate in rear thereof and by means of which, together with the guide-wheels in advance of the cultivating-disks, the latter may be caused to operate at any required depth in the soil.

A further object of my invention is to combine with the said vertically-adjustable runners cultivator-wings which operate in rear of the cultivator-disks and coact therewith on the soil to stir and pulverize the same between the rows and throw the soil toward the plants.

A further object of my invention is to provide improved means for supporting the cultivator-disks, for adjusting the same vertically, and for setting the same obliquely to the line of draft and at any desired angle with relation thereto.

A further object of my invention is to provide improved means for guiding the cultivator when the same is in operation.

A prime object of my invention is to provide a cultivator which is adapted to cultivate two rows of corn at a time, whether the corn be listed or planted in the ordinary manner, and which may be used for cultivating the corn throughout the growing season and for "laying it by" at the final cultivation.

A further object of my invention is to provide the cultivator-frame with cultivating-shovels, carried on the rear side thereof, and means for adjusting said shovels vertically and for raising and lowering the same, the said shovels being adapted to be used either in connection with the cultivating-disks or independently thereof.

In the accompanying drawings, Figure 1 is a top plan view of a corn-cultivator constructed in accordance with my invention. Fig. 2 is a sectional view of the same, taken on a plane indicated by the line $a\,a$ in Fig. 1. Fig. 3 is a top plan view of a single section of a cultivator embodying the modified form of my invention. Fig. 4 is a sectional view taken on a plane indicated by the line $b\,b$ of Fig. 3. Fig. 5 is a detail elevation showing the construction and combination of the parts which form the adjustable support for one of the cultivating-disks. Fig. 6 is a similar view of one of the cultivating-shovels and its support. Fig. 7 is a detail view of a modification. Fig. 8 is a detail view showing the cultivating shovel and support detached.

In the embodiment of my invention I provide a cultivator-frame 1, which is composed of two rectangular sections 2, which in the form of my invention shown in Fig. 1 are secured together by the front cross-bar 3, a space being formed between the proximate sides of the said sections. Each of the said sections, in addition to the front bar 3, which is common to both of them, comprises a pair of side bars 4, a cross-bar 5, which connects said side bars 4 together near their rear ends, and a longitudinally-disposed central bar 6, which connects the arched portions $3^a\,5^a$ of said bars 3 and 5, respectively. A rock-shaft 7 has its end journaled in bearings in the rear ends of the side bars 4, and the central portion of said rock-shaft is arched, as at $7^a$, and to the same is attached an adjusting-lever 8, which has a locking-dog 9, of the usual construction, that coacts with a segment-plate 10 on the bar 6 to lock the said lever at any desired adjustment.

The seat 11 for the driver is supported by a bar 12, which connects the frame-sections 2 together at a point in rear of the front bar 3.

To the front cross-bar 3 of the cultivator are secured vertical standards 13 by means of clip-bolts, which admit of the adjustment of said standards on said bar 3, so that said standards may be located at any desired distance apart. In the form of my invention shown in Fig. 1 I employ two of the said standards, one near the outer side of each of the frame-sections 2. Each of the standards 13 is provided on its rear side, near its upper and lower ends, with a pair of lugs 14.

In the form of my invention shown in Figs. 1 and 2 the standards 15 are disposed on the rear sides of the standards 13 and are provided with lugs 16, which coact with the lugs 14 and with a pivotal bolt 17 to hinge said standards 15 to the rear sides of standards 13, so that said standards 15 may be turned in any required direction. Said standards 15 are provided near their upper ends with rearward-extending arms 18, and the said standards carry guiding and supporting wheels 19, the outer sides of which form conic frustums, as shown. A handle-lever 20 is journaled in a bearing 21 on the rear side of the central portion of cross-bar 3, said lever extending rearward, so as to be within easy reach of the driver, and said lever has an arm 22, which is connected to the arms 18 of standards 15 by a rod 23. It will be understood from the foregoing and by reference to Figs. 1 and 2 of the drawings that by turning the hand-lever 20 the standards 15 may be turned as may be required to cause the guide-wheels 19 to track in any required direction. The said lever 20 is provided with the usual spring-pressed locking-dog 24, which by engagement with the rack 25, with which bearing 21 is provided, secures said lever at any desired adjustment.

Blocks 26 are placed on the rear bars 5 and are disposed on the front sides thereof. Each of the said blocks has its front side provided with a sector 27, which is toothed, as shown in Fig. 5. An adjustable block 28 is similarly toothed and fitted on the front side of block 26, and said block 28 has a vertical groove in its front side, in which is fitted the upper portion of a standard 29, which has a bearing 30 at its lower end for a revoluble cultivator-disk 31. Eyebolts 32 engage the said standard 29 and extend through lugs 33, formed on blocks 26, and through a clamping-yoke 35 on the rear side of cross-bar 5. Thereby the standard 29 is firmly attached to the cross-bar 5, is adapted to be vertically adjusted to cause the cultivator-disks to run as deeply as may be desired, and by means of the blocks 26 28 the inclination of the standard 29 may be varied at will. Furthermore, it is apparent that the standard may be turned in the eyes of the bolts 32 in order to adjust the disks to any required angle with relation to the line of draft.

In the form of my invention here shown each section of the cultivator-frame is provided with a pair of the cultivating-disks 31 and their supports, constructed as above described, and the said cultivator-disks are so disposed as to operate on opposite sides of the rows of corn. Any suitable number of such cultivator-disks may be employed in connection with each of the cultivator-frame sections, and I do not limit myself in this particular. One of the cultivator-disks is disposed in rear of a guide-wheel 19, and the latter, the edges of which cut deeply into the soil, obviate lateral movement of the cultivator-frame and lateral displacement of the cultivator-disks and enable the latter to be run as closely to the rows of growing plants as may be desirable.

In rear of each of the cultivating-disks is a standard 36, which is secured on the rear side of the cross-bar 5 by means of a bolt, as at 37, and is vertically adjustable on said cross-bar. At the lower end of the said standard is a rearward-curved runner 38, which operates in rear of the disk and regulates the depth at which the disk runs in the soil. Cultivator-wings 39 40 are secured to the runner at the front end thereof, as at 41, said cultivator-wings being curved outward and rearward from the said runner and disposed on opposite sides thereof. The function of the said cultivator-wings is to stir the soil in rear of the cultivator-disks and to move the soil inward toward the plants.

On the rock-shafts 7 are secured rearward-extending arms 42, each of which comprises a pair of sections 43, which embrace the rock-shaft between them, as at 44, and are bolted together and clamped on the said rock-shaft by the bolts 45, which serve to secure the arm firmly to the rock-shaft and adapt it to be laterally adjustable thereon. As here shown, I provide each rock-shaft 7 with two of the arms 42; but any suitable number of the said arms may be provided for each rock-shaft. Vertically-adjustable standards 46 are secured to the rear ends of the arms 42, as at 47, and the said standards carry cultivating-shovels 48. The said cultivating-shovels operate in rear of the cultivating-disks and in the form of my invention here shown are disposed on the outer side of the runners 38. Any suitable number of the cultivators 48 may be employed. The same may be disposed on the rock-shaft at any required relative position by the means hereinbefore described, and the said cultivating-shovels 48 may be either employed in connection with the cultivator-disks, as here shown, or they may be employed without the said cultivator-disks. By turning the rock-shafts 7 by means of the levers 8, hereinbefore described, the cultivator-shovels 48 may be raised from or lowered to the ground, as may be desirable.

In the form of my invention shown in Figs. 1 and 2 I provide a pair of shafts 49 at the center of the cultivator-frame, on the front side thereof, for a draft-animal which will walk between the rows, and I provide singletrees 50 near the outer corners of the cultivator-frame for draft-animals which will walk on the outer sides of the rows.

As hereinbefore indicated, the cultivator is adapted for cultivating corn which has been listed, as well as for cultivating corn which has been planted in the usual manner, and by the provision of the arches 3ª 5ª 7ª the cultivator is adapted to be used in cultivating the corn throughout the growing season and for finally laying it by.

In the modified form of my invention shown in Figs. 3 and 4 I dispense with the means hereinbefore described for directing the course of the guide-wheels 19, dispense with the standards 15, and secure the bearings for the guide-wheels directly to the standards 13. In this form of my invention I employ two of the guide-wheels on the front cross-bar 3 of each frame-section 2, the said guide-wheels facing outwardly from the center of the said frame-section in opposite directions. In this form of my invention the said frame-sections 2 are connected together by a longitudinally-disposed board 51, and each of the said frame-sections is laterally adjustable on the said board, so that the said frame-sections may be disposed as closely together or as far apart as may be desirable. Each of said frame-sections 2 in this modified form of my invention is further provided with a draft-tongue 52, (indicated at Fig. 3,) the rear end of the draft-tongue being connected to the front end of the bar 6.

It will be understood that the cultivator may be provided with a single frame of suitable width instead of having the frame made in two sections secured together, as hereinbefore described. It will be further understood that the two sections 4 of the frame may be secured directly to each other and the connecting-bar 12 (shown in Fig. 1) dispensed with.

The standards 36 may be secured to the bars 5 by clamp devices such as are shown and described for supporting the revoluble disks.

The wings 39 40, shown in connection with the runners 38, may be removed therefrom when not required, and said wings may be adjusted to any desired inclination with reference to said runners.

It will be understood that the revoluble disks may be so disposed as to throw the earth either toward or from the corn, as may be required.

When cultivating corn for the first time, the wheels 19 are disposed at a slight angle to the line of draft, and the disks 31 and runners 38 are disposed in line with said wheels, the wheels, disks, and runners running astride the rows of corn in the bottoms of the furrows and the disks being so disposed as to throw the earth from the young plants, the wings 40, which follow, throwing the fine earth toward the plants and the wings 39 engaging the earth on the outer sides of the furrows and cutting into the same and cutting off, overturning, and burying the weeds. This arrangement of the wheels 19, disks 31, and runners 38 is shown in Fig. 3. The shovels 48, also shown in said figure, may be either employed as there shown or removed, as may be desired.

In Fig. 8 of the drawings I show the standard 48 provided with a crook or offset 46ª, whereby the standard above the shovel 48 is disposed to one side of the said shovel to enable trash uprooted or stirred by the shovel to pass over the same without being caught by the standard, thereby preventing the cultivator from becoming clogged with trash.

Having thus described my invention, I claim—

1. In a cultivator, the combination of a frame guide-wheels at the front thereof, runners supporting the rear of said frame, a rock-shaft having arms extending rearward therefrom, cultivators having their standards attached to said arms and a lever to turn said rock-shaft and thereby raise or lower the cultivator-shovels, substantially as described.

2. In a cultivator of the class described, the combination of a frame, standards secured to the front side thereof and carrying guide-wheels which support the front side of said frame, runners which support the rear side of said frame, said runners having cultivating-wings on opposite sides thereof, and cultivator-disks carried by said frame and disposed between and substantially in line with said guide-wheels and supporting-runners, substantially as described.

3. In a cultivator, the combination of a frame, having a bar, a block fitted on said bar and having oppositely-extending lugs at its rear side and provided on its front side with a toothed segment, a clamping-yoke on the side of said bar opposite said block, an outer block engaging and adjustable on said segment-block, a standard carrying a cultivating-disk and bearing against the front side of said outer block, and eyebolts, having their shanks passed through openings in the lugs of the segment-block, and in said clamping-yoke, the said standard being fitted in the eyes of said bolts, the latter serving to clamp the said standard on said outer block, and to clamp said outer block, segment-block, yoke and frame-bar together, substantially as described.

In testimony that I claim the foregoing as my own I have hereto affixed my signature in the presence of two witnesses.

ELI E. HARTZELL.

Witnesses:
C. M. DAVEY,
S. V. LOVLEY.